United States Patent [19]
Hamley

[11] Patent Number: 5,481,177
[45] Date of Patent: Jan. 2, 1996

[54] ELECTRONIC CHARGING SYSTEM

[76] Inventor: James P. Hamley, 2922 Cottonwood Dr. SE., Mill Creek, Wash. 98012

[21] Appl. No.: 129,023

[22] Filed: Sep. 29, 1993

Related U.S. Application Data

[63] Continuation of Ser. No. 931,862, Aug. 18, 1992, abandoned.

[51] Int. Cl.$^6$ .................................................. H01M 10/46
[52] U.S. Cl. ................................................. 320/23; 320/40
[58] Field of Search .................................. 320/2, 21, 30, 320/39, 40, 48, 23

[56] References Cited

U.S. PATENT DOCUMENTS

| | | | |
|---|---|---|---|
| 3,624,481 | 11/1971 | Macharg | 320/39 |
| 3,864,617 | 2/1975 | Smith et al. | 320/39 X |
| 3,919,617 | 11/1975 | Tippett et al. | 320/39 |
| 3,919,618 | 11/1975 | Coleman et al. | 320/39 |
| 3,927,361 | 12/1975 | Macharg | 320/39 |
| 3,970,913 | 7/1976 | Heindl | 320/40 X |
| 4,031,450 | 6/1977 | Hammel et al. | 320/39 X |
| 4,109,193 | 8/1978 | Schultheis | 320/2 |
| 4,266,178 | 5/1981 | Asakawa | 320/39 |
| 4,636,703 | 1/1987 | Tohya et al. | 320/2 |
| 4,794,315 | 12/1988 | Pederson et al. | 320/2 |

Primary Examiner—Peter S. Wong
Assistant Examiner—Edward Tso

[57] ABSTRACT

A charging system has an input terminal, coupled to a power source, and an output terminal coupled to the load or battery under charge. The charging system includes an adjustable regulator having an input coupled to the input terminal and an output coupled to the output terminal with its control terminal under control of controller circuitry. The controller circuitry senses the state of charge of the load and provides a controlled, tapered charge thereto until such time that the load is fully charged. At the fully charged state, the controller changes the voltage at the control terminal of the regulator to cease all charging. Charging does not continue until the sensed level of charge of the battery drops to a predetermined recharge state at which point charger activity continues. The disclosed charger can be housed in a small, light weight enclosure and mounted at a location close to the battery with permanent connections thereto. The power source may be provided as a wall mount transformer having an interconnection to the remotely located charger.

30 Claims, 4 Drawing Sheets

ELECTRONIC CHARGING SYSTEM

This is a continuation of application Ser. No. 07/931,862 filed on Aug. 18, 1992, now abandoned.

BACKGROUND OF THE INVENTION

The present invention is directed to the electrical charging art and in particular, to a battery charging system which includes control circuitry for maintaining a full charge on, but not over charging, a battery.

There are numerous applications in which the battery powered or battery dependent system is left unattended for extensive periods. Examples are infrequently used vehicles such as automobiles, motorcycles or boats. A battery left in an unattended state will gradually lose its charge and suffer cell to cell variations arising from temperature differences between cells or impurities and minute differences in the cells themselves. A prolonged battery undercharged state causes the plates to sulfate and results in a permanent loss of battery capacity. This degradation mode can only be avoided by periodic recharging of all cells. Further, periodic recharging assures that the battery is charged to a state such that its suitable for its intended purpose, such as providing sufficient current to start and run an associated engine.

While charging systems known to the prior art are capable of charging a battery, they suffer from numerous disadvantages.

Charging beyond the batteries maximum capacity can significantly degrade battery life. Over charging can lead to corrosion of the plate grids and result in excessive gassing, which shortens cell life. Thus, once the battery becomes charged to its full capacity, the charging current should cease. Not even a trickle or "topping" charge is permissible.

Even though a battery is not charged beyond it maximum charge capacity, it may be charged at a rate that is excessive and leads to shortened battery life. A high charge rate can increase electrolyte temperatures to above 125° Fahrenheit and result in gassing and corresponding cell degradation. Charging systems, however, charge at high rates as an apparent convenience to the user, thereby shortening battery life.

As a battery approaches its full charge state, the charge rate should be tapered to prevent gassing. While this feature is often provided in prior charging systems, as described above it is imperative for long battery life that the charge rate completely cease when the battery becomes fully charged.

Batteries have been known to short, and installers have been known to short the output from battery chargers or, worse yet, reverse the charger connections to the battery. Probably the single largest cause for the failure of chargers is transformer overheating due to a short or near-short at the charger output.

In charger applications involving high ambient temperatures, the problem of transformer heating is further exacerbated also leading to improper operation, or failure of prior art chargers. The charging indicating systems typically provided with prior art chargers are inadequate at best and often misleading. The common indicator is an ammeter which indicates current flow to the battery. Such flow does not necessarily reflect the state-of-charge of the battery, which is the crucial measure of whether the battery requires further charging.

A further problem with prior-art chargers is that they require manual supervision. A typical charger requires an operator to hook up the system, remembering to remove the connection to other associated circuits to eliminate the possibility of spikes from the charger damaging electronic equipment. The charger is then left on for a period of time and must be manually disconnected. The potential for the charger to drain the battery during periods when the charger is turned off, coupled with the above related problem of an operating charger damaging electrical equipment which is normally coupled to the battery, has required that prior-art chargers be manually disconnected from the battery when not in use.

Further, prior art chargers are large, bulky and heavy items such that even if they were electrically suited to be permanently connected to a battery, such connection would not be practical.

SUMMARY OF THE INVENTION

It is an object of the present invention, therefore, to provide an improved charging system which is capable of sensing the state of charge of the battery and completely terminating charging current once the battery is charged to its maximum capacity.

It is a further object to provide the above improved charging system which is capable of tapering its charge rate to the battery as the battery approaches its fully charged state.

A further object of the present invention is to provide the above described battery charger in a design which is short-circuit proof, reverse connection safe and thermally stable.

It is an additional object of the present invention to provide the above described improved charging system which is adapted for a permanent installation to a battery without the various problems normally attendant therewith.

Briefly, according to the invention, a charging system comprises an input terminal adapted to be connected to a power source and an output terminal adapted to be coupled to the load to be charged. An adjustable regulator has an input coupled to the input terminal, an output coupled to the output terminal and a control terminal. The adjustable regulator produces a controlled voltage at its output responsive to the control signal applied to its control terminal. A controller has an input coupled to the output terminal and an output coupled to the adjustable regulator's control terminal. The controller includes means to sense the state of charge of a load and, responsive thereto: (a) apply a predetermined charge-on control signal to the control terminal responsive to the load's charge state being less than a predetermined full-charge level to cause the adjustable regulator output to charge the load; (b) apply a predetermined charge-off control signal to the control terminal responsive to the load's charge state reaching a predetermined charge level to cause the adjustable regulator output to cease charging the load; and (c) reapplying the predetermined charge-on control signal to the control terminal responsive to the state of charge of the load dropping from the predetermined full charge level to a different predetermined recharge level.

In a further aspect of the invention, the charging system also includes means for predeterminedly tapering the charge rate to the load as the load approaches the full charge level.

In yet a further aspect of the invention, the charging system further comprises a means for substantially decoupling the charging system from the load responsive to the absence of power being applied to the input terminal, whereby the charging system can be permanently connected to the load without significantly draining the charge therefrom.

In a further aspect of the invention, the improved charging system includes an indicator which clearly displays whether or not the battery is fully charged.

In yet a further aspect of the invention, the charging system is combined with a power source comprising a wall mount transformer and interconnect means for connecting the output from the wall mount transformer to the charging system input terminal.

DETAILED DESCRIPTION

Figure 1:
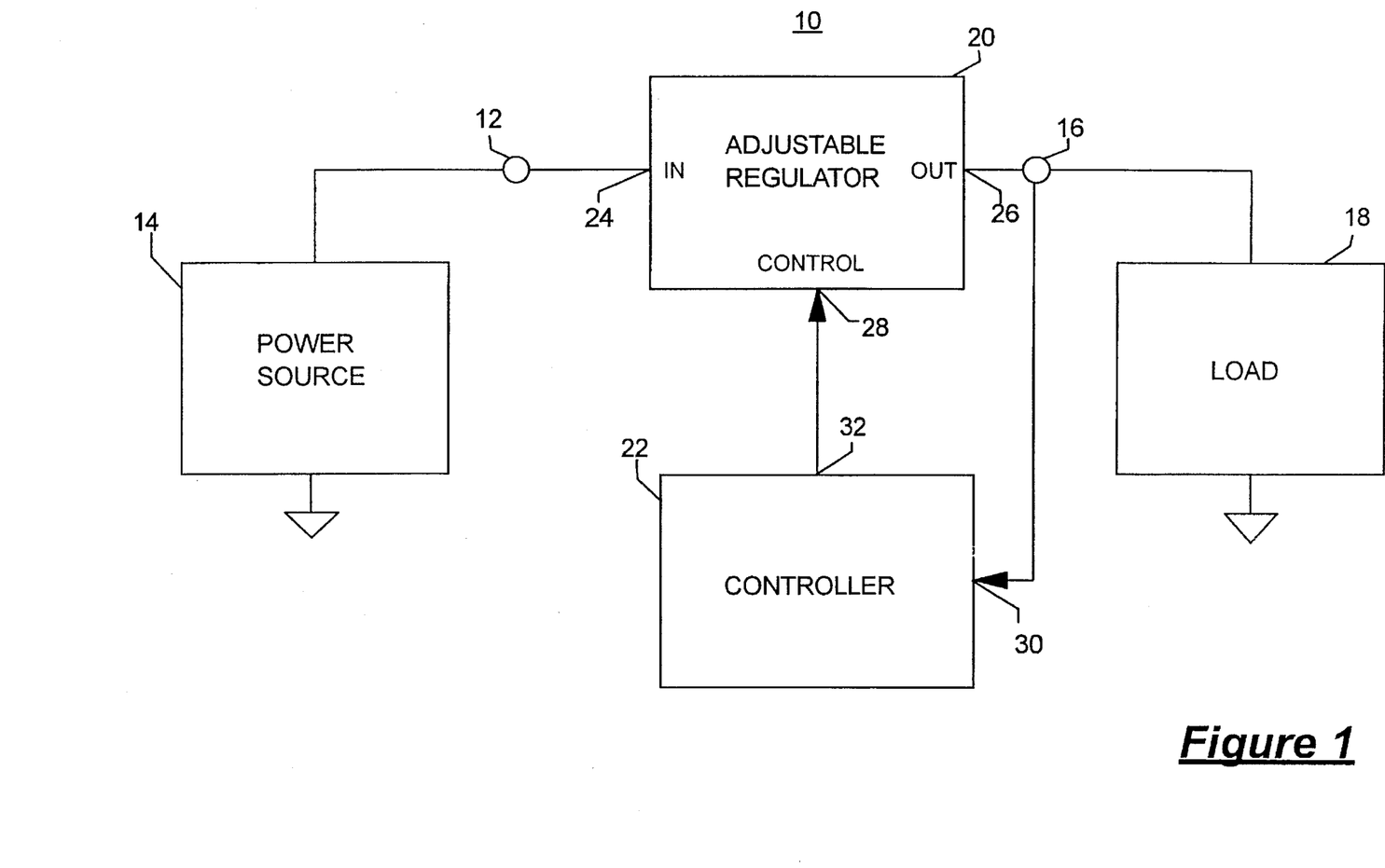
FIG. 1 is a general block diagram illustrating the principal components of the charging system according to the preferred embodiment of the invention.

FIG. 1 is a block diagram illustrating the principal components of the preferred embodiment of the inventive charging system. The charging system is indicated generally at 10. It has an input terminal 12 which is adapted to be connected to a power source 14. The charging system 10 is provided with an output terminal 16 which is adapted to be connected to a load 18 to be charged, such as a battery.

The internal components of the charging system 10 are an adjustable regulator 20 and a controller 22. The adjustable regulator 20 has an input 24 which couples to the input terminal 12 and an output 26 which couples to the output terminal 16. The adjustable regulator 20 also includes a control terminal 28. In the normal manner, adjustable regulator 20 responds to the control signal at its control terminal 28 to produce an appropriate output voltage on its output terminal 26.

The controller 22 has an input 30 which connects to the output terminal 16. It also includes an output 32 which connects, and applies an appropriate control signal to, control terminal 28.

The basic operation of the charging system as shown in FIG. 1 is as follows. Controller 22, via its input 30, senses the voltage, and therefore state of charge, of the load 18. If this state of charge is sensed to be less than the full charge state of the load 18, the controller 22 produces a control signal at its output 32 which, when coupled to the control terminal 28, causes the adjustable regulator 20 to produce an output voltage suitable for charging the load 18.

Upon the controller 22 sensing that the load 18 has been charged to its full charge level, a charge-off-signal is produced at controller output 32 and, when coupled through control terminal 28, causes the adjustable regulator 20 to reduce its output voltage to a point such that all further charging to the load 18 ceases.

The controller 22 continues to sense the state of charge of the load 18, and when the state of charge drops from the predetermined full charge level to a predetermined recharge level, a charging-signal is again produced at its output terminal causing the adjustable regulator 20 to repeat the charging cycle. In this way, the load 18 is maintained at or near its full charge state, but is not charged beyond this state, even by a trickle or "topping" type charge which can lead to overheating and reduced capacity of the plates.

Figure 2:
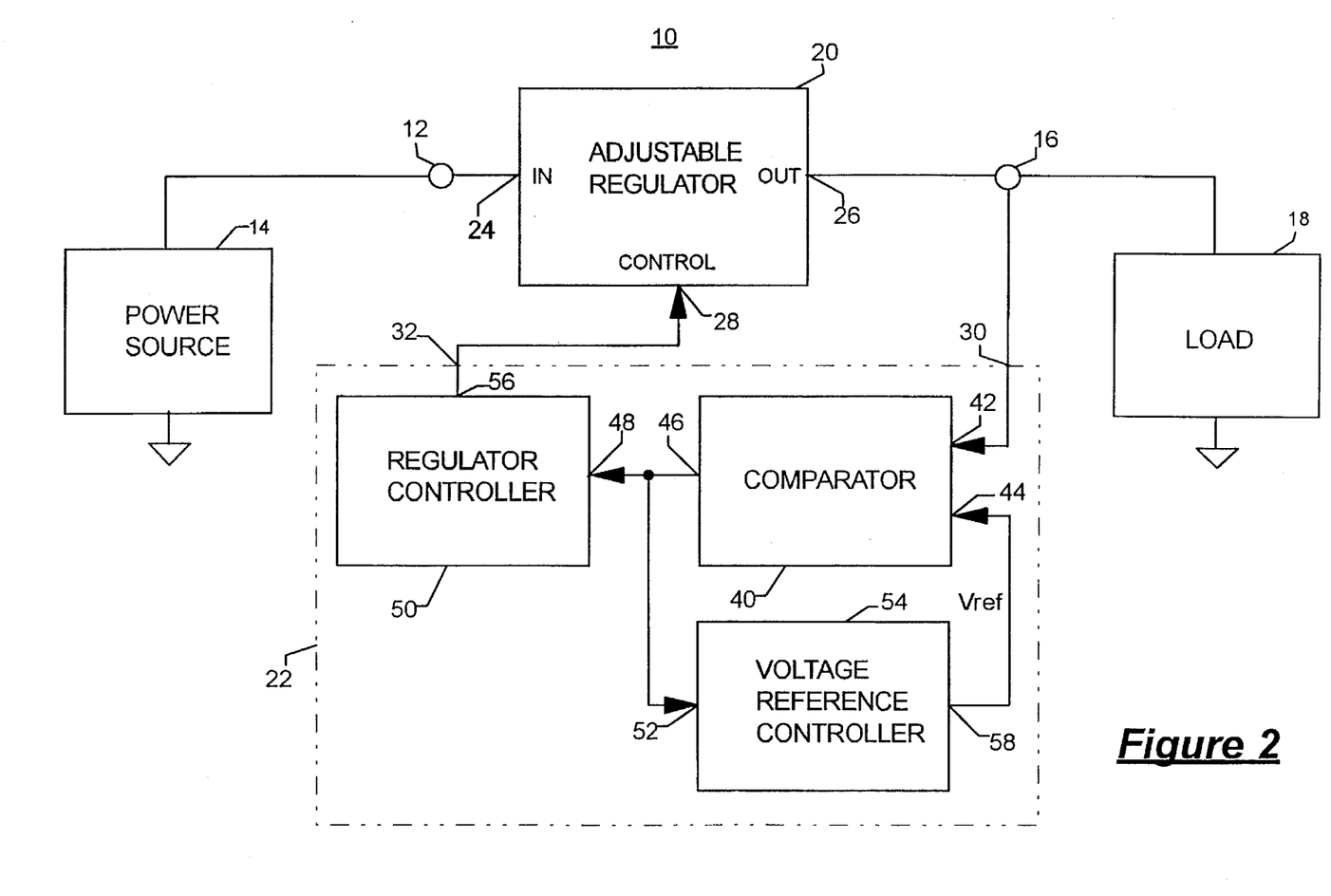
FIG. 2 is a more detailed block diagram of the preferred embodiment of the invention.

FIG. 2 is a more detailed block diagram illustrating the charger, indicated generally at 10, having an input terminal 12 connected to power source 14 with an output terminal 16 connected to the load 18 to be charged. The provided adjustable regulator 20 has an input 24 coupled to the input terminal 12 and an output 26 coupled to output terminal 16. A control terminal 28 of adjustable regulator 20 controls the voltage produced at output 26.

As shown in FIG. 2, the controller 22 comprises an input 30 which couples to the output terminal 16 and an output 32 which couples to the control terminal 28. Here, the controller 22 is comprised of a comparator 40 which has a first input 42 coupled to the controller input 30 and a second input 44. The comparator 40 output is provided at an output terminal 46.

Output terminal 46 from comparator 40 connects both to the input 48 of a regulator controller 50 and to the input 52 of a voltage reference controller 54. The output 56 from the regulator controller couples to the output 32 from the controller 22. The output 58 from the voltage reference controller 54 connects to the second input 44 of the comparator 40.

Operation of the charging system as depicted in FIG. 2 is understood as follows. The first input 42 of comparator 40 monitors the voltage across and therefore, the state of charge of the load 18. Applied out of voltage reference controller 54 to the second input 44 of comparator 40 is a predetermined voltage reference which represents full charge of the load 18. In the event that the sensed voltage at the first input 42 is determined to be less than the reference voltage applied at the second input 44, comparator 40 produces a charge-on signal at its output 46 which, when coupled through the regulator controller 50 produces a control signal at control terminal 28 suitable to produce a charging voltage at the output from adjustable regulator 20.

As the charge in load 18 increases, its sensed voltage at the comparator first input 42 will increase until such time that this voltage reaches a level corresponding to a full charge state of the load 18. Now, comparator 40 will switch its output signal at output 46 to a charge-off level which, through regulator controller 50, produces a control signal at control terminal 28 to reduce the output from adjustable regulator 20 so that any further charging to the load 18 is ceased. Also, the charge-off signal from comparator 40 is sensed by the voltage reference controller 54, which now produces an output reference level representing that state of charge of the load 18 at which a recharge by the charging system should be instituted. Once the load voltage drops to the predetermined recharge level, the comparator 40 will then be activated to its charge-on mode and the cycle will repeat.

In one preferred embodiment of the invention, the full charge state of the load, a conventional lead-acid vehicle battery, was determined to be 14.4 volts. Thus, once the battery charged to 14.4 volts, comparator 40 switched to its charge-off mode. The reference voltage out of voltage reference controller 54 was designed to re institute charging when the charge voltage at load 18 dropped to 11.4 volts.

Figure 3:
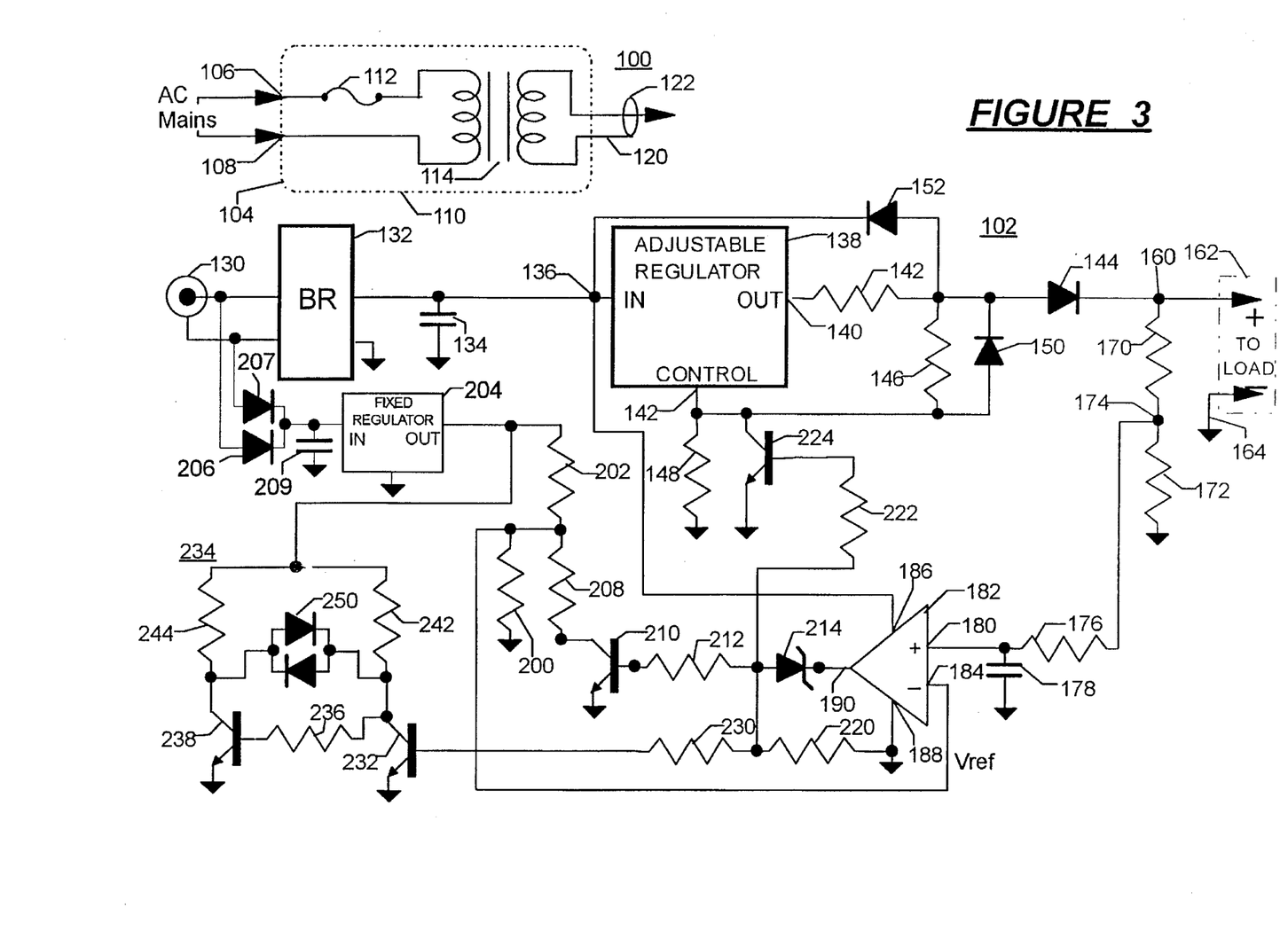
FIG. 3 is a detailed schematic diagram illustrating one construction of the preferred embodiment of the invention.

FIG. 3 is a detailed schematic diagram of a preferred embodiment of the invention. The embodiment as shown in FIG. 3 is comprised of two principle components, a power supply, indicated generally at 100 and the remote charging system, indicated generally at 102. The preferred embodiment as shown in FIG. 3 is designed such that the charging system 102 may be provided in an enclosure and permanently mounted near, and permanently wired to a battery to be charged. (See FIG. 4.) The bulkiest and heaviest portion of the overall charger, the transformer, is provided in the power source 100 which is, preferably, a wall mount transformer. As is described more fully herein below, interconnect means includes a plug on the power source 100 and a jack at the input of the remotely located charging system 102 that allows quick and effective connection and disconnection between the two primary components.

The power supply 100 is, as described above, principally comprised of a wall mount transformer 104. Wall mount transformer 104 has a pair of contacts 106, 108 intended to be plugged into the AC power mains. The contacts 106, 108 extend from a plastic enclosure 110 which houses a series fuse 112 and a power transformer 114. The power transformer, in the usual manner, provides isolation and also steps the voltage from the power mains down to a desired voltage and current level. The secondary output from the transformer 114 is coupled as an AC signal out through a line 120 to an output plug 122. Line 20 is of appropriate length such that the power source 100 can be plugged into a wall outlet wherever convenient, and the plug 122 routed to its corresponding jack on the charging system 102 which mounts near and permanently connects to a battery (See FIG. 4.)

The charging system 102, as described above, receives AC input power via a jack 130. The AC power from the jack 130 is fed to a full-wave bridge rectifier 132. The full-wave rectified output from rectifier 132 is filtered, through a filter capacitor 134 and applied to the input 136 of an adjustable voltage regulator 138. Voltage regulator 138 includes an output 140 and a control terminal 142. In the preferred embodiment, adjustable regulator 138 produces a voltage at its output 140 which is predeterminedly related to the voltage applied to the control terminal 142.

Connected from the output 140 of the voltage regulator 138 is a charge tapering resistor 142, the opposite end of which connects to the anode of a blocking diode 144. Also connected to the anode end of blocking diode 144 is bias resistor 146, the opposite end of which connects to terminal 142. An additional biasing resistor 148 connects from the control terminal 142 to ground.

A first protection diode 150 has its anode connected to the control terminal 142 and its cathode connected to the common connection of resistors 142 and 146. A second protection diode 152 has its anode connected to the cathode of diode 150 and its cathode connected to the input 136 of adjustable regulator 138. In the known manner, protection diodes 150 and 152 protect adjustable regulator 138 from discharges of any capacitors in the system.

The cathode of diode 144 connects to the output terminal 160 of the charging system. This output terminal is permanently wired to the positive terminal of the load 162. Permanently wired to the negative terminal of load 162 is a circuit ground connection 164.

The voltage across, and thus the state of charge of the load 162 is sensed by a voltage divider comprised of series connected resistors 170, 172 between output terminal 160 and circuit ground. Thus, the divided down voltage across the load 162 appears at the common connection 174 of resistors 170, 172. This sense voltage is passed through a filter comprised of series resistor 176 and shunt capacitor 178 to the positive input 180 of a comparator 182. Comparator 182 is, preferably, comprised of an integrated circuit comparator or operational amplifier. It includes a second, inverting input 184, a power terminal 186, a ground terminal 188 and an output terminal 190.

The reference voltage applied to the negative input 184 of comparator 182 couples from one end of a resistor 200, the remaining end of which connects to circuit ground. Resistor 200 in turn connects to a bias resistor 202, the opposite end of which is fixed at a fixed bias level through a fixed regulator 204. Fixed regulator 204 receives its bias current through a diode pair 206, 207 which connect to the AC power inputs of the bridge rectifier 132. A filter capacitor 209 filters the DC power input to fixed regulator 204. The fixed regulator 204 produces a stable, predetermined voltage at its output. This output is assured regardless of variations in the load applied to the charger as a result of the use of separate rectifier diodes 206, 207 and filter capacitor 209. Power to the bias input terminal 186 of comparator 182 is taken from the output of fixed regulator 204.

Connected in parallel with resistor 200 is a resistor 208 which connects to the collector of a switching transistor 210. The emitter of switching transistor 210 connects to circuit ground, with its base connected through a current limiting resistor 212 to the anode of a Zener diode 214, the cathode of which connects to the output 190 of the comparator 182. Also connected to the anode of Zener diode 214 is a bias resistor 220 to ground and a current limiting resistor 222 which connects to the base of a switching transistor 224. The collector of switching transistor 224 connects to the control terminal 142, and the emitter of switching transistor 224 connects to circuit ground.

Finally, also connected to the anode of Zener diode 214 is a current limiting resistor 230 which connects to the base of a switching transistor 232. Switching transistor 232 is a component part of an indicating system indicated generally at 234. This indicating system also includes a current limiting resistor 236 which connects from the collector of switching transistor 232 to the base of switching transistor 238. Emitters of both switching transistors 232, 238 connect to circuit ground. Connected to the collector of each switching transistor 232, 238 are collector resistors 242, 244, respectively. Collector resistors 242, 244 connect together at their opposite end and in turn receive bias voltage out of fixed regulator 204. The indicator is comprised of a red/green light emitting diode 250 which includes parallel, but reverse polarity connected red and green light emitting diodes. Light emitting diode 250 is connected such that the anode of the green light emitting diode connects to the collector of switching transistor 238 with it cathode connected to the collector of switching transistor 232.

Operation of the charging circuit as shown in FIG. 3 is understood as follows. AC voltage provided by the wall mount transformer 104 is coupled through the connector 120 and plug 122 to the input jack 130 of the charging system 102. As mentioned herein above, in this, the preferred embodiment of the invention, the charging system is housed in a small, light weight enclosure which is permanently mounted near, and permanently connected to the load or battery to be charged. AC voltage appearing at the input jack 130 is full wave rectified by bridge rectifier 132 and filtered by capacitor 134 to produce a DC signal at the input to the adjustable voltage regulator 138. In this, the preferred embodiment of the invention, adjustable regulator 138 is comprised of a National Semiconductor Type LM317T integrated circuit. The LM317T adjustable voltage regulator has built in current limiting, output short circuit proofing and thermal regulation, thus adding all of these aspects to the charger design. Bias resistors 146 and 148 are selected in accordance with the specification sheet of adjustable regulator 138 to assure that, with switching transistor 224 turned off, the voltage appearing at the output 140 of regulator 138 is sufficient to charge the load 162.

The output 140 from the regulator 138 is passed through the charge taper resistor 142. Charge taper resistor 142, which, in the preferred embodiment has a value of 0.2 Ohms, assures that as the load 162 begins approaching its fully charged state, the charge rate tapers to prevent gassing of the load 162. The charging current from regulator 138 then passes through the isolation diode 144. When the regulator 138 is in its charge-on mode, the voltage appearing out of the regulator 138 exceeds the voltage at the load 162 such that isolation diode 144 is forward biased and passes charging current. When, however, the charging system 102 is switched to its charge-off state, or when power is removed from the jack 130, isolation diode 144 is reverse biased thereby preventing the charging system 102 from draining the charge from battery 162. However, to accurately sense the state of charge of the battery, the voltage divider comprised of resistors 170, 172 is placed directly across the battery, and on the cathode side of the isolation diode 144. However, due to the extremely high input impedance of the comparator 182, the values of the resistors 170, 172 can be selected to produce a negligible drain on load 162.

The sense voltage from voltage divider 170, 172 is filtered to remove noise components via resistor 176 and shunt capacitor 178 and applied to the positive input 180 of the comparator 182. The reference voltage applied at the negative input of comparator 184 is the stable voltage as developed by fixed regulator 204 divided by voltage divider resistors 202 and 200. In the charge-on mode of operation, the output from comparator 182 is low whereby switching transistor 210 is in its off state and resistor 208 does not contribute to the voltage appearing at the inverting input 184 of the comparator 182. Thus, in the charge-on mode of operation, the reference voltage at the comparator 182 is determined strictly by the value of fixed regulator 204 as divided down through resistors 202 and 200. This voltage, combined with the reference voltage sensed at the battery as divided by divider 170, 172 is selected such that the comparator output 190 is at its low state until such time that the charge across the battery reaches a fully charged level of 14.4 volts.

Once the load 162 is sensed as fully charged, the output from comparator 182 switches from its low to its high state whereby switching transistors 210, 224 and 232 are turned on. Now, via switching transistor 224, the control terminal of regulator 138 is taken virtually to ground potential whereby output 140 from regulator 138 assumes a voltage which ceases charging of the load 162.

Also, with switching transistor 210 driven into its saturation point, resistor 208 is placed in parallel with resistor 200, to thereby change the reference voltage appearing at the inverting input of comparator 182. Now, the output 190 from comparator 182 will remain in its high, charge-off state until such time that the charge as sensed across load 162 has dropped to the new reference level as determined by fixed regulator 204, resistor 202 and the parallel connection of resistors 200, 208. In one preferred embodiment of the invention, these components were selected such that comparator 182 does not switch back to its low output, charge-on state until the voltage across the load 162 has dropped to 11.4 volts.

Absent the change in reference level as described above, the system could oscillate between its active and inactive states as the voltage across the load made minor fluctuations around its fully charged state. The design as disclosed assures a defined charge rate to the battery and a defined off period of the charging system until the battery charge state has dropped to a level requiring a recharge.

The status of the charging system is indicated by the indicator 234. In the charge-on state, the output from comparator 182 is low whereby switching transistor 232 is biased off. Thus, the collector of switching transistor 232 assumes a high voltage which biases switching transistor 238 on and allows current to flow from the output of fixed regulator 204 through collector resistor 242 and the red portion of light emitting diode 250 to ground thereby lighting the red LED indicating that charging is in progress.

When the output from comparator 182 switches to its high state, indicating the charge-off condition, switching transistor 232 is biased on, whereby its collector voltage goes low turning off switching transistor 238 and allowing current to flow through the green portion of light emitting diode 250, thereby indicating the charge-off condition, i.e. an indication that the battery is fully charged.

Figure 4:
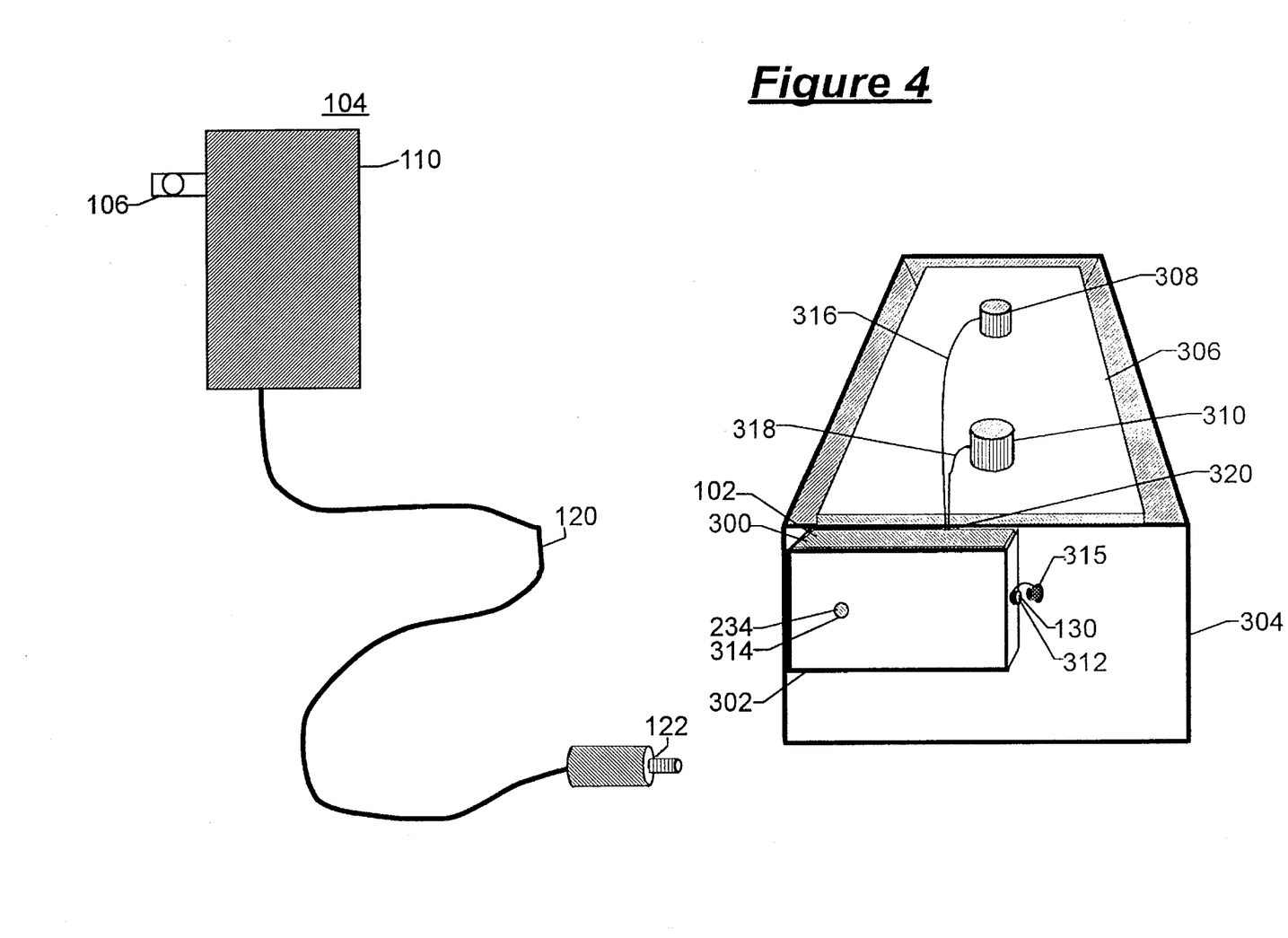
FIG. 4 is the preferred embodiment of the invention configured as a wall-mount transformer which, via a connecting cord and plug, provide power to the charger which is both permanently connected to a battery and housed in a battery case.

FIG. 4 depicts one preferred mechanical construction of the power source/charging system arrangement.

Here, the power source comprises a wall mount transformer 104 housed in a plastic case 110. The wall mount transformer has a pair of AC prongs, one of which is shown at 106, adapted to be plugged into a standard wall outlet. Power from the wall mount transformer 104 is carried over a line 120 to a power plus 122.

The charging system 102 is preferably housed in a rectangular plastic enclosure 300 which is designed to be received in a pocket 302 molded into a plastic battery case 304. The battery case is shaped to receive a battery 306 which has a pair of power terminals 308, 310.

The pocket 302 in battery case 304 is designed to hold the charging system 102 in secure position and is provided with an aperture 312 with a keepered-cover 315. With the cover 315 removed as shown, the plug 122 may be inserted into the jack 130 of the charging system 102. The pocket 302 is also provided with a window 314 which permits viewing of the charging system 102 indicator 234.

A lip formed in the top cover (not shown) of the battery case 304 completes the housing around the charging system.

A pair of connectors 316, 318 connect the charging system 102 to the terminals 308, 310, respectively. A provided groove 320 in the battery case 304 facilitates routing of the connectors 308, 310.

The ease and flexibility of use of the power source/ charging system as shown in FIG. 4, coupled with the precision of operation of the charging system solves the long felt need in the charging art.

In addition, for applications such as boat engine batteries in which the battery is located in an engine hold or well, the threat of an explosion due to sparking in the presence of localized gas vapors is minimized by the present design since the high voltage connection to the transformer is made remotely from the engine compartment-with only a low voltage, low current lead in the vicinity of the engine hold.

In summary, an approved charging system has been described in detail. The charging system controllably charges the load to its fully charged condition, then ceases charging to prevent load degradation. Upon the charge state falling to a defined level, the system re institutes the charging cycle.

The charging system is provided with means to taper the charge rate to the load as the load approaches its full charge level. In addition, the charging system includes means which decouples the charger from the battery when the charger is in its off state. The charger may be constructed in a small, light weight enclosure which is mounted near, and permanently wired to the battery.

Whereas the preferred embodiment of the invention has been described in detail, it should be apparent that many modifications and variations thereto are possible, all of which fall within the true spirit and scope of the invention.

I claim:

1. A charging system comprising:
   an input terminal for coupling to a power source;
   an output terminal for coupling to a load to be charged;
   an adjustable regulator having an input coupled to said input terminal, an output coupled to said output terminal and a control terminal, said adjustable regulator producing a controlled signal at its output responsive to the control signal applied to said control terminal;
   controller means having an input coupled to said output terminal and an output coupled to said control terminal, said controller means including means to sense the state of charge of the and, responsive thereto:
   (a) apply a predetermined charge-on control signal to said control terminal responsive to the load's charge state being less than a predetermined full charge level to cause said adjustable regulator output to charge the load;
   (b) apply a predetermined charge-off control signal to said control terminal, responsive to the load's charge state being greater than a predetermined full charge level, to cause said adjustable regulator output to cease charging the load; and
   (c) reapply said predetermined charge-on control signal to said control terminal responsive to the state of charge of the load dropping from said predetermined full charge level to a different predetermined recharge level; and,
   means for predeterminedly tapering charge rate to the load as the load approaches said full charge level.

2. The charging system of claim 1 wherein said load to be charged is comprised of a rechargeable battery.

3. The charging system of claim 1 further comprising means for substantially decoupling said charging system from the load responsive to the absence of power being applied to said input terminal, whereby said charging system can be permanently connected to the load without significantly draining charge therefrom.

4. The charging system of claim 2 further comprising means for substantially decoupling said charging system from the load responsive to the absence of power being applied to said input terminal, whereby said charging system can be permanently connected to the load without significantly draining charge therefrom.

5. The charging system of claim 1 in combination with the power source comprising a wall mount transformer and interconnect means for connecting an output from said wall mount transformer to said charging system input terminal.

6. The charging system of claim 3 in combination with the power source comprising a wall mount transformer and interconnect means for connecting an output from said wall mount transformer to said charging system input terminal.

7. The charging system of claim 4 in combination with the power source comprising a wall mount transformer and interconnect means for connecting an output from said wall mount transformer to said charging system input terminal.

8. The charging system of claim 1 further comprising indicating means for providing a positive indication of the state of the load being fully charged.

9. The charging system of claim 1 further comprising indicating means for providing a positive indication of the state of the load being fully charged.

10. The charging system of claim 3 further comprising indicating means for providing a positive indication of the state of the load being fully charged.

11. The charging system of claim 5 further comprising indicating means for providing a positive indication of the state of the load being fully charged.

12. The charging system of claim 1 in combination with a case for said load, wherein said case is formed with a section to receive and house said charging system.

13. The charging system of claim 2 in combination with a case for said load, wherein said case is formed with a section to receive and house said charging system.

14. The charging system of claim 3 in combination with a case for said load, wherein said case is formed with a section to receive and house said charging system.

15. The charging system of claim 5 in combination with a case for said load, wherein said case is formed with a section to receive and house said charging system.

16. A charging system automatically operable between charge-on and charge-off modes comprising:
   a power source;
   an adjustable voltage regulator having an input terminal connected to said power source, an output terminal and a control terminal, said regulator responding to a control signal at its control terminal to produce a predetermined level signal at its output terminal;
   a charger output terminal coupled to said adjustable voltage regulator output for coupling to a load to be charged;
   comparator means having a first input connected to said charger output terminal, a second input, and an output, said comparator means producing a predetermined charge-on mode signal at its output terminal responsive to a first predetermined relationship between signals at said comparator means first and second inputs, and a predetermined charge-off mode signal at its output terminal responsive to a second predetermined relationship between the signals at its first and second inputs:
   regulator controller means having an input coupled to the output of said comparator means and an output coupled to the control terminal of the adjustable regulator, said regulator controller means responding to said first predetermined charge-on signal at said comparator output terminal to cause said adjustable regulator to produce a signal appropriate for charging the load, and responding to said predetermined charge-off signal at said comparator means output terminal to cause said adjustable regulator to produce a signal appropriate to prevent charging of the load;
   a reference controller means coupled to said comparator means second input for coupling a first predetermined reference level thereto responsive to said comparator means producing said predetermined charge-on signal at its output, and coupling a second predetermined reference level thereto responsive to said comparator means producing said predetermined charge-off signal at its output, said predetermined first reference level corresponding to the state of said load being fully charged such that upon said fully charged state being reached, said comparator means switches to produce said predetermined charge-off signal thereby ceasing further charging of the load until such time as the state of charge thereof falls to a level corresponding to said reference controller means second predetermined reference level, whereby said comparator means is switched to produce its charge-on signal thereby effecting re-charging of the load; and, means for predeterminedly tapering charge rate to the load as the load approaches its fully charged state.

17. The charging system of claim 16 wherein said load to be charged is comprised of a rechargeable battery.

18. The charging system of claim 16 further comprising means for substantially decoupling said charging system from the load responsive to the absence of power being applied from said power source, whereby such charging system can be permanently connected to the load without significantly draining a charge therefrom.

19. The charging system of claim 16 further comprising means for substantially decoupling said charging system from the load responsive to the absence of power being supplied from said power source, whereby said charging system can be permanently connected to the load without significantly draining a charge therefrom.

20. The charging system of claim 16 wherein said power source comprises a wall mount transformer and interconnect means for connecting an output from said wall mount transformer to the remainder of said charging system.

21. The charging system of claim 20 wherein said power source comprises a wall mount transformer and interconnect means for connecting an output from said wall mount transformer to the remainder of said charging system.

22. The charging system of claim 18 wherein said power source comprises a wall mount transformer and interconnect means for connecting an output from said wall mount transformer to the remainder of said charging system.

23. The charging system of claim 16 further comprising indicating means for providing a positive indication of the state of the load being fully charged.

24. The charging system of claim 17 further comprising indicating means for providing a positive indication of the state of the load being fully charged.

25. The charging system of claim 18 further comprising indicating means for providing a positive indication of the state of the load being fully charged.

26. The charging system of claim 20 further comprising indicating means for providing a positive indication of the state of the load being fully charged.

27. The charging system of claim 16 in combination with a case for said load, wherein said case is formed with a section to receive and house said charging system.

28. The charging system of claim 16 in combination with a case, wherein said case is formed with a section to receive and house said charging system.

29. The charging system of claim 19 in combination with a case for said load, wherein said case is formed with a section to receive and house said charging system.

30. The charging system of claim 20 in combination with a case for said load, wherein said case is formed with a section to receive and house said charging system.

* * * * *